United States Patent [19]
Robinson

[11] Patent Number: 5,564,993
[45] Date of Patent: Oct. 15, 1996

[54] CONTINOUSLY-VARIABLE-RATIO TRANSMISSION OF THE TOROIDAL-RACE ROLLING-TRACTION TYPE

[75] Inventor: Leslie K. Robinson, Preston, England

[73] Assignee: Torotrak (Development) Limited, London, England

[21] Appl. No.: 351,453

[22] PCT Filed: Jun. 29, 1993

[86] PCT No.: PCT/GB93/01358
§ 371 Date: Dec. 13, 1994
§ 102(e) Date: Dec. 13, 1994

[87] PCT Pub. No.: WO94/01697
PCT Pub. Date: Jan. 20, 1994

[30] Foreign Application Priority Data

Jul. 3, 1992 [GB] United Kingdom .................... 9214190

[51] Int. Cl.$^6$ ................................ F16H 15/38; F16J 1/22
[52] U.S. Cl. ................................ 476/10; 92/110; 92/166; 92/168; 92/179; 92/255
[58] Field of Search ...................... 476/8, 10, 40, 476/41, 42; 92/110, 179, 187, 189, 165 R, 166, 168, 255

[56] References Cited

U.S. PATENT DOCUMENTS

| | | | |
|---|---|---|---|
| 3,158,071 | 11/1964 | Gut | 92/255 X |
| 3,631,767 | 1/1972 | Meier | 92/165 R |
| 3,828,618 | 8/1974 | Sharpe et al. | 476/10 X |

FOREIGN PATENT DOCUMENTS

| | | |
|---|---|---|
| 0373650 | 6/1990 | European Pat. Off. . |
| 1600973 | 10/1981 | United Kingdom . |
| 1600972 | 10/1981 | United Kingdom . |
| 90/05860 | 5/1990 | WIPO . |
| 92/08912 | 5/1992 | WIPO . |
| 92/11475 | 7/1992 | WIPO . |

Primary Examiner—Allan D. Herrmann
Attorney, Agent, or Firm—Davis, Bujold & Streck, PA

[57] ABSTRACT

A roller-control unit for a continuously-variable-ratio transmission of the toroidal-race rolling-traction type, in which the roller carriage (10, 14) is connected by a pivotal joint (30) to the piston (15) of a hydraulic piston-and-cylinder unit (15, 16). The piston (15) is double-acting, and the piston/cylinder contact is the only locus through which the roller carriage (10, 14) makes contact with the fixed structure of the transmission. The piston (15) may have an inner part (32) to which the roller carriage (10, 14) is jointed, and a sleeve-like outer part (33, 34) which makes the necessary sliding and sealing contacts with the cylinder (16), but allows the roller carriage (10, 14) the necessary freedom of pivoting movement during use.

9 Claims, 2 Drawing Sheets

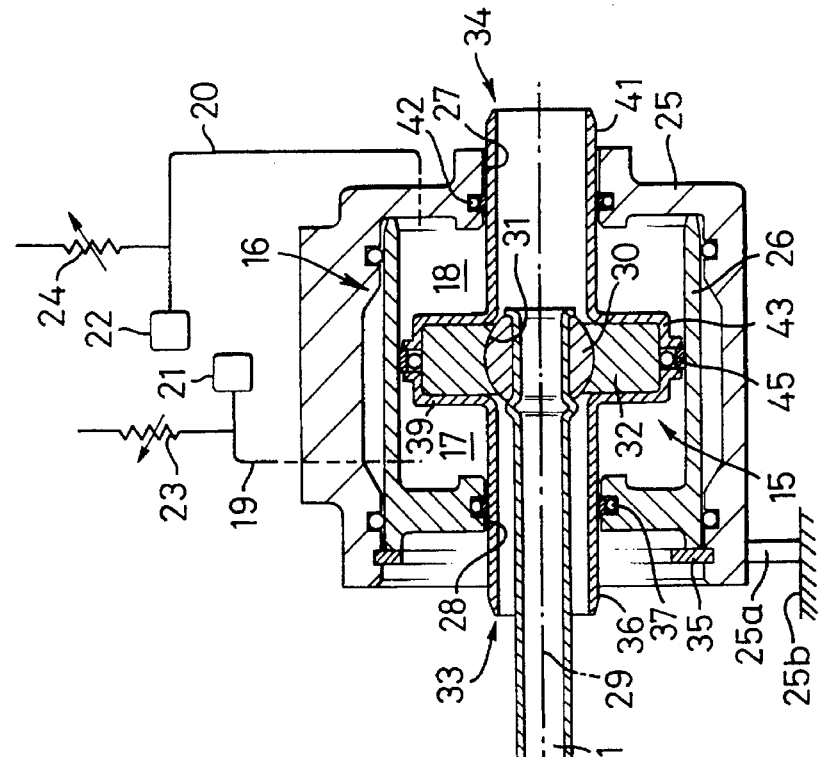
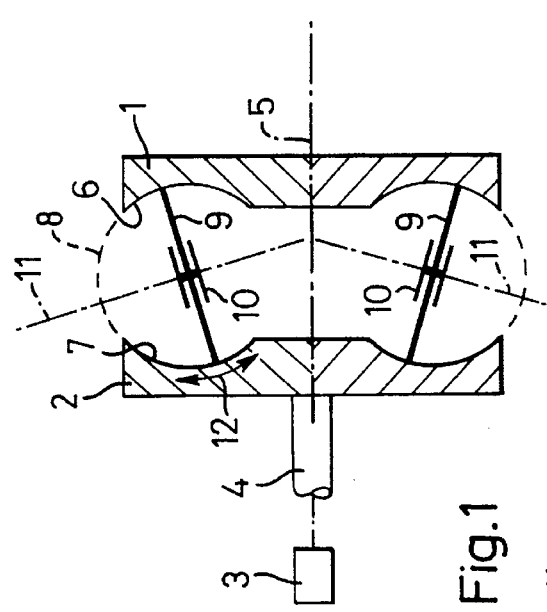

5,564,993

CONTINOUSLY-VARIABLE-RATIO TRANSMISSION OF THE TOROIDAL-RACE ROLLING-TRACTION TYPE

BACKGROUND OF THE INVENTION

1. Field of the Invention

This invention relates to continuously-variable-ratio transmissions ("CVT's⇌) of the toroidal-race rolling-traction type, and in particular to roller-control units of the kind by which the orientation of the traction-transmitting rollers may be controlled hydraulically, by means of the direct connection of the carriage of each roller to a piston, movable within a hydraulic cylinder connected to a controlled source of variable fluid pressure.

2. Description of the Prior Art

Several patent publications of recent years, of which WO90/05860 is an example, describe toroidal-race transmissions in which direct connection of each roller to a piston subject to controlled hydraulic pressure suffices to maintain the angular orientation of each roller—and thus the ratio transmitted by it from an input disc to an output disc—at the appropriate value at all times. The key to the efficacy of such an apparently simple method of roller control is that for any given combination of the essential parameters (operator demand, engine load and speed, final output speed etc.,) of the complete driveline of which the CVT is part, for each angular orientation that each roller may take up within its possible range of such orientations there will be a unique torque loading to which that roller will be subjected. A control system receives inputs representative of all the essential parameters, and sets up within the cylinder the appropriate hydraulic pressure to match the torque reaction associated with the desired orientation, so causing the roller to seek and hold that orientation.

One of the problems encountered in practice by CVT's, in which the rollers are so controlled, is that whereas the centre of a simple piston executes a straight-line motion as that piston reciprocates within its cylinder, the motion required of the centre of a roller of a toroidal-race CVT, as that roller changes its orientation, is not straight-line. Instead, the roller centre must be able to travel a short distance back and forth along the circumference of the centre circle of the imaginary torus, to whose outline the surfaces of the co-operating races formed on the input and output discs must correspond. The roller centre must therefore move along an arc. To accommodate this, in most of the embodiments described in publication WO90/05860 the sealing ring of the piston has a part-spherical outer face, allowing the piston to tilt slightly within the cylinder without losing sealing contact with it. Such a design, although practicable, requires more careful manufacture and assembly than a simple piston, and in particular requires a special seal where the piston rod passes through the cylinder end, to accommodate the wobbling of the rod which results from the tilting of the piston. Also, where the piston Is double acting (as it is in several of the embodiments in WO90/05860) it is practically difficult to avoid inequality of area for the opposite faces of the piston, because a dummy rod, mounted on the rear face of the piston, would require the complexity of a second special seal where It passed through the rear end wall of the cylinder.

Patent Specifications GB-A-1600972 and GB-A-1600973 both relate to CVT's of the toroidal-race rolling-traction type, and show examples of their respective inventions in which the rollers are controlled hydraulically and each roller is connected to a non-tilting piston by a link connected to that piston by a simple pivoting joint. However, all those examples have two significant features in common. Firstly the pistons are single-acting only, which is all they need to be in the alternator unit, or other aircraft accessory, to which the inventions of these two publications are primarily directed. Secondly, in those examples the contact between the piston and the cylinder does not constitute the only locus of effective contact between each roller and the fixed structure of the CVT, because the link connecting each roller to its piston also extends away from the roller on the side remote from the piston, and a spigot at the extremity of that remote side of the link engages with and Is constrained by a fixed slot.

SUMMARY OF THE INVENTION

The present invention arises from appreciating a means of using a double-acting piston of conventional movement within its cylinder, but connecting that piston to its roller in such a way that the roller centre is capable of the necessary arcuate movement, and the angular orientation of each roller is adequately defined by a single locus of contact between structure which moves with the roller, and the fixed structure of the CVT. The invention is defined by the claims, the contents of which are to be read as included within the disclosure of the specification, and the invention also includes roller-control units and CVT's as shown in the accompanying figures of drawings.

BRIEF DESCRIPTION OF THE DRAWINGS

Embodiments of the invention will now be described with reference to those drawings in which:

FIG. 1 illustrates some basic geometry of a toroidal-race rolling-traction CVT diagrammatically;

FIG. 2 is a section through two rollers and its associated piston-and-cylinder units, taken in a plane including a diameter of the roller and the cylinder axis.

DESCRIPTION OF THE PREFERRED EMBODIMENTS

Figure 3:
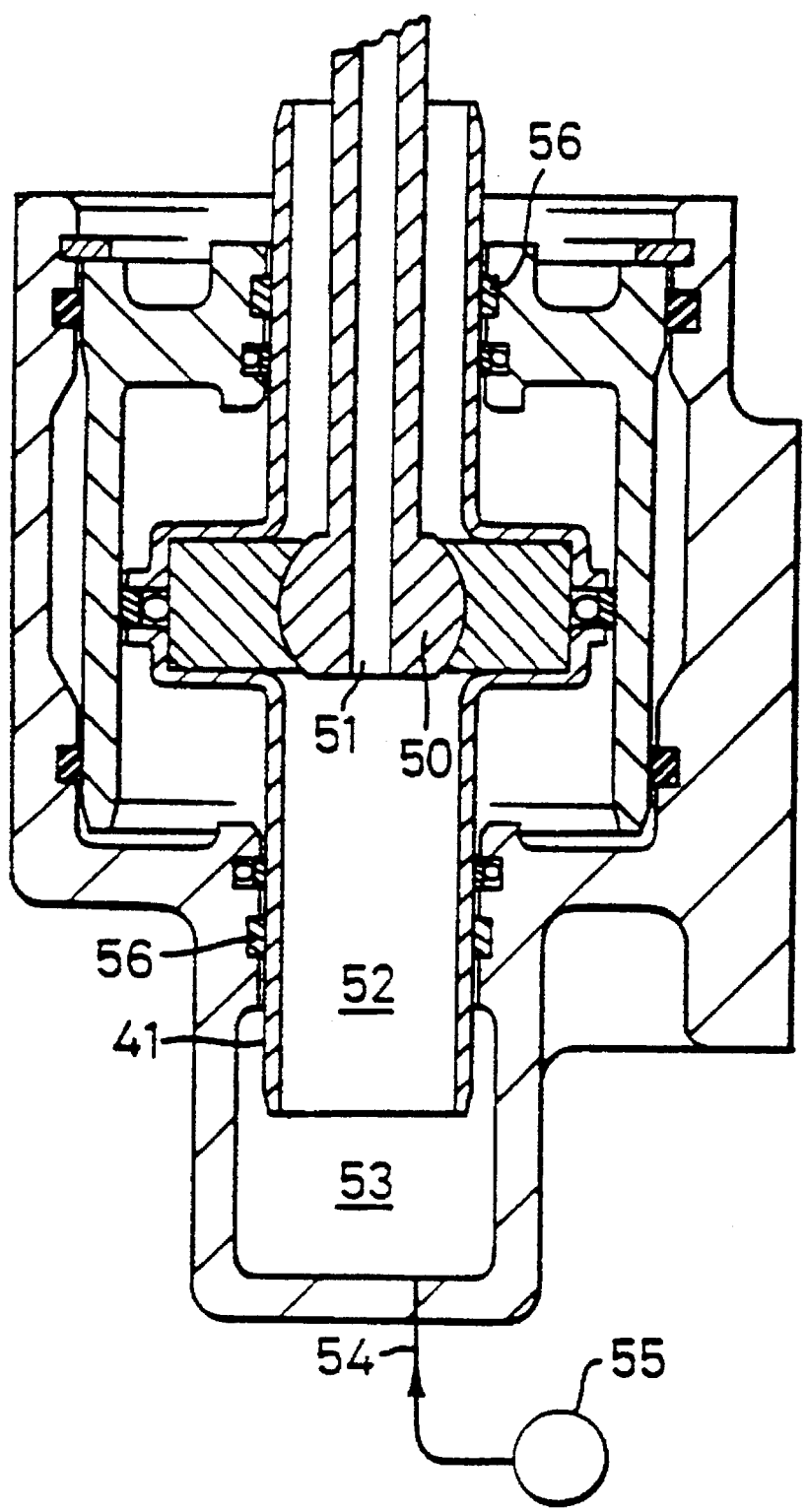
FIG. 3 is a similar section through an alternative piston-and-cylinder unit.

FIG. 1 shows an output disc 1 and an input disc 2, the latter driven by a power source 3 by way of a shaft 4, rotatable about a common axis 5. Discs 1 and 2 are formed with races 6 and 7, the surfaces of which conform to parts of the outline of an imaginary torus having the same common axis 5: the remainder of the outline of the torus is indicated in broken lines at 8. A set of rollers 9, usually three in number and located at equal angular intervals around axis 5, span the clearance between discs 2 and 1 and transmit traction between them by rolling in contact with races 7 and 6. One of those rollers, mounted in bearings in a carriage 10 so as to spin about an axis 11 is shown in FIG. 1. It will be apparent that if carriage 10 and roller 9 alter their orientation by tilting in the sense indicated by the arrow 12, the speed ratio transmitted from disc 2 to disc 1 varies also. When roller 9 contacts race 7 at relatively low radius and race 6 at relatively high radius, output disc 1 rotates slower than input disc 2 and the transmission is in low ratio. Conversely when the roller contacts races 7 and 6 at relatively high and low radii respectively, output disc 1 rotates faster than input disc 2 and the transmission is said to be in high ratio. Such transmissions are now well understood in more detail by the man in the art, and are the subject of many publications in patent and other technical literature.

FIG. 2 is more detailed and shows the roller 9 mounted in bearings 13 within a first part 10 of the roller carriage so as to be rotatable about axis 11. The roller carriage also comprises a second part in the form of a link shaft (connection member) 14, fixed to first part 10 and connecting it to a double-acting unit comprising a piston 15 movable within a cylinder 16, the opposite chambers 17 and 18 of which are connected by conduits 19, 20 to pumps 21, 22 and pressure control valves 23, 24 respectively. By operation of the valves 23, 24, the pressure of operating fluid delivered by the pumps to chambers 17, 18 can be varied to control the force exerted upon roller 9 by piston 15, so that that force balances the desired torque reaction to be experienced by the roller.

As shown, for ease of manufacture the cylinder 16 may comprise an outer housing 25 which is firmly anchored at 25a to the fixed structure 25b of the CVT and may be relatively roughly finished but fitted with a more accurate inner liner 26 against which the piston makes contact. Housing 25 and liner 26 are formed with circular end apertures 27 and 28, coaxial with the cylinder axis 29. The liner 26 is retained within housing 25 by retaining ring 35.

According to the invention a washer 30, with a part-spherical outer surface, is press-fitted over the remote end of link shaft 14 and fits a corresponding part-spherical central cavity 31 within a disc-shaped core or central member 32 of the piston 15. The core 32 is sheathed within a sleeve formed in two parts 33, 34. Part 33 has a shank 36 passing through a ring seal 37 in cavity 28, and an enlarged and flanged end 39 which is press-fitted over one side face of core disc 32. Part 34 has a shank 41 passing through a ring seal 42 in cavity 27, and a similar flanged end 43 which press-fits over the other side face of core 32. An annular seal 45, which in use constitutes the piston ring of piston 15, conveniently fits into a gap between the flanges 39 and 43.

Although piston 15 is constrained to a simple back-and-forth movement within cylinder 16, so that the axes of piston and cylinder are coincident (along 29) at all times, the freedom of movement provided by the contacting part-spherical surfaces of the joint 30/31, and the generous clearance between the inner wall of shank 36 and the link shaft 14 within it, allow the centre 47 of roller 9 to follow an arcuate path 48. This path corresponds to part of the circumference of the centre circle of the imaginary torus of FIG. 1. Because roller 9 is in practice likely to be mounted with castor angle between discs 1 and 2, so that axis 29 is always inclined to the plane which passes through roller centre 47 and lies at right angles to the transmission axis 5, there will always be some side thrust upon piston 15. Ring seal 45 may be ill-suited both to serve as an efficient piston ring and to withstand this side thrust, so ring seals 37 and 42 may with advantage be strengthened and/or augmented (e.g. by thrust rings 56, FIG. 3) to withstand such thrust and maintain the axes of piston and cylinder coincident at all times.

Among the advantages of the construction are firstly the simplicity of the jointing of link shaft 14 to the centre of piston core 32. Secondly the freedom of relative motion presented by that joint. Thirdly the lack of need for any great accuracy in the finish of the solid piston core 32, because the accuracy can be provided by the much lighter sleeve parts 33, 34 which are then fitted over it.

In the alternative construction of FIG. 3 (from which for simplicity the hydraulic circuitry components 19–24 of FIG. 2 are omitted) a solid part-ball end 50 is formed on link shaft 14, and the interior bore 51 of that link communicates, by way of the interior 52 of shank 41, with an end chamber 53 of cylinder casing 25. Chamber 53 may be connected by way of conduit 54 to a source 55 of lubricating oil, so creating a route by which lubrication can reach the roller 9, by way of a port 57 formed In carriage part 10 as shown In FIG. 2.

I claim:

1. A roller-control unit, for a continuously-variable-ratio transmission of the toroidal-race rolling-traction type having a plurality of roller carriages (10), each carriage rotatably supporting an associated roller (9) and each carriage (10) being connected to an associated one of a plurality of said roller-control units, each said control unit comprising a hydraulic piston-and-cylinder unit for controlling the orientation of the rollers (9) and thus controlling the transmitted ratio of the continuously-variable-ratio transmission, said roller-control unit comprising:

a cylinder (16), for being mounted on a fixed supporting structure (25B) of the transmission, a piston (15) slidably and sealingly received in the cylinder (16), an elongate connection member (14) extending between and connecting the piston to the carriage (10) supporting the roller (9);

wherein the piston (15) is double-acting and the connection member (14) is connected to the piston by a pivotal joint (30, 31) located within the piston, an aperture (28) is formed in one end of the cylinder (16) on a central longitudinal axis (29) of the cylinder, the piston (15) carries an elongate hollow sleeve (36) which slidably and sealingly extends through the aperture (28), whereby the sleeve creates a sealed sliding fit within the aperture as the piston moves back and forth within the cylinder and the piston is constrained to move within the cylinder such that the axes of the cylinder (29) and piston are coincident at all times, the connection member (14) extends from the piston (15), through the hollow sleeve (36) and the aperture (28), to the carriage (10), and the interior dimensions of the hollow sleeve are sufficiently larger than the outer dimensions of the connection member (14) to provides the necessary clearance between the sleeve (36) and the connection member (14) for the connection member as it pivots about the pivotal joint (30, 31).

2. A roller-control unit according to claim 1 wherein the pivotal joint is a ball joint.

3. A roller-control unit according to claim 1 wherein the cylinder (16) has first and second end members enclosing opposite ends, respectively, of the cylinder, the piston (15) comprises a central member (32) to which the carriage (10) is pivotally connected via the connection member (14) and the pivotal joint (30, 31), and the sleeve (36) is part of a tubular sleeve member (33, 34) having axial extremities (36, 41) and a central region (39, 43), the central region has a greater diameter than the axial extremities and the central member (32) is received in the central region (39, 43).

4. A roller-control unit according to claim 3 wherein the tubular sleeve member (33, 34) comprises two parts (33 and 34) separated by a ring-shaped clearance around the periphery of the central member of the piston, and a piston ring (45) is received in the clearance and effects a slidable seal between the piston (15) and the cylinder (16).

5. A roller-control unit according to claim 3 wherein apertures (27, 28) are formed in each of the end members of the cylinder (16) along the central longitudinal axis (29) of the cylinder, the axial extremities (36, 41) pass through respective said apertures (27, 28), and sliding seals (37, 42)

located in each of the apertures (27, 28) form a sliding seal between the apertures and the axial extremities (36, 41), so that the axial extremities (36, 41) of the tubular sleeve member sealingly slide within the apertures (27, 28) whenever the central region of the sleeve slides within the cylinder.

6. A roller-control unit according to claim 5 wherein guidance means (56) are interposed between an outer peripheral surface of the axial extremities (36, 41) of the tubular sleeve member and an inner peripheral surface of the apertures (27, 28) in the end members to guide the axial extremities along the longitudinal axis (29) of the cylinder and to resist any sideways thrusts upon the piston, thereby assisting to maintain the axes (29) of the piston (15) and the cylinder (16) coincident at all times.

7. A roller-control unit according to claim 6 wherein the guidance means (56) between the axial extremities of the tubular sleeve member and the apertures in the end members are adjacent to and spaced from the sliding seals (37, 42).

8. A roller-control unit according to claim 3 wherein the connection member (14) is formed with an internal bore (51) for the supply of lubricant, one end (57) of the bore (51) communicates with the roller and the other end of the bore (51) communicates with a source of lubricant by way of an interior of the tubular sleeve member.

9. A roller-control unit according to claim 1 in combination with a continuously variable transmission of the toroidal-race rolling-traction type.

* * * * *